(12) United States Patent
Sethuraman et al.

(10) Patent No.: US 11,700,038 B2
(45) Date of Patent: Jul. 11, 2023

(54) ENHANCEMENT OF RANGE AND THROUGHPUT FOR MULTI-ANTENNA WIRELESS COMMUNICATIONS DEVICES

(71) Applicant: Cypress Semiconductor Corporation, San Jose, CA (US)

(72) Inventors: Prasanna Sethuraman, Bangalore (IN); Visakh Asok, Kerala (IN); Paul Strauch, Pleasanton, CA (US); Rajendra Kumar Gundu Rao, Bangalore (IN); Ayush Sood, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/886,527

(22) Filed: May 28, 2020

(65) Prior Publication Data
US 2020/0382172 A1    Dec. 3, 2020

Related U.S. Application Data

(60) Provisional application No. 62/854,515, filed on May 30, 2019.

(51) Int. Cl.
*H04B 7/0413*    (2017.01)
*H04B 7/06*    (2006.01)

(52) U.S. Cl.
CPC ......... *H04B 7/0413* (2013.01); *H04B 7/0697* (2013.01)

(58) Field of Classification Search
CPC ............................ H04B 7/0413; H04B 7/0697
See application file for complete search history.

(56) References Cited

U.S. PATENT DOCUMENTS

| | | | | |
|---|---|---|---|---|
| 5,740,526 | A * | 4/1998 | Bonta | H04B 7/0817 |
| | | | | 455/277.2 |
| 6,085,076 | A * | 7/2000 | Lindsay | H04B 7/0604 |
| | | | | 455/133 |

(Continued)

FOREIGN PATENT DOCUMENTS

EP     2810382 A1 * 12/2014    ........... H04B 7/0608

OTHER PUBLICATIONS https://en.wikipedia.org/wiki/Optimum_(disambiguation). (Year: 2021).*

(Continued)

*Primary Examiner* — Jean B Corrielus (57) ABSTRACT

Systems, methods, and devices select antennas to enhance the range and throughput of wireless communications devices. Methods include identifying a plurality of combinations of antennas based on a plurality of available antennas for a wireless communications device, and generating, using a processing device included in a multiple-input-multiple-output (MIMO) device, a plurality of quality metrics including at least one quality metric for each of the identified combinations of antennas, where each of the at least one quality metrics represents a signal quality of a signal associated with each of the plurality of antennas, and wherein the signal is a spatial stream. Methods further include selecting at least two antennas from the plurality of combinations of antennas based, at least in part, on the plurality of quality metrics, where the at least two antennas are selected for use by the wireless communications device during a transmitting or receiving operation.

20 Claims, 8 Drawing Sheets

(56) References Cited

U.S. PATENT DOCUMENTS

| | | | | |
|---|---|---|---|---|
| 6,757,267 | B1* | 6/2004 | Evans | H04B 7/0615 |
| | | | | 342/374 |
| 7,627,301 | B2 | 12/2009 | Zhou et al. | |
| 8,644,262 | B1 | 2/2014 | Sun et al. | |
| 8,804,560 | B2 | 8/2014 | Zhao et al. | |
| 9,083,074 | B2 | 7/2015 | Ayatollahi et al. | |
| 9,578,520 | B2* | 2/2017 | Bhattad | H04B 7/0874 |
| 9,742,481 | B1 | 8/2017 | Jorgovanovic et al. | |
| 10,003,393 | B2 | 6/2018 | Greene | |
| 10,128,931 | B2* | 11/2018 | Rothaar | H01Q 21/0012 |
| 10,531,316 | B1 | 1/2020 | Ichapurapu et al. | |
| 10,581,155 | B1 | 3/2020 | Gradinaru et al. | |
| 10,609,673 | B2* | 3/2020 | Kumar | H04W 64/006 |
| 2005/0085195 | A1 | 4/2005 | Tong et al. | |
| 2006/0270343 | A1 | 11/2006 | Cha et al. | |
| 2007/0224949 | A1 | 9/2007 | Morton et al. | |
| 2011/0250926 | A1 | 10/2011 | Wietfeldt et al. | |
| 2013/0072115 | A1* | 3/2013 | Dobyns | H04B 7/0608 |
| | | | | 455/41.1 |
| 2014/0329470 | A1* | 11/2014 | Chen | H04B 7/0413 |
| | | | | 455/67.7 |
| 2016/0035330 | A1 | 2/2016 | Singh et al. | |
| 2016/0095055 | A1* | 3/2016 | Sarrigeorgidis | H04B 1/525 |
| | | | | 370/311 |
| 2016/0233902 | A1* | 8/2016 | Choudhary | H04W 72/1215 |
| 2016/0241320 | A1* | 8/2016 | Roberts | H04B 7/0632 |
| 2016/0373170 | A1* | 12/2016 | Szini | H04B 7/0417 |
| 2017/0026067 | A1* | 1/2017 | Thomas | H03J 1/0008 |
| 2017/0054518 | A1* | 2/2017 | Cho | H04B 17/336 |
| 2017/0181219 | A1* | 6/2017 | Cesares Cano | H04W 72/042 |
| 2020/0006988 | A1 | 1/2020 | Leabman | |
| 2020/0015161 | A1 | 1/2020 | Ramasamy et al. | |
| 2020/0091971 | A1 | 3/2020 | Dehghan et al. | |

OTHER PUBLICATIONS

Viterbo, Emanuele, "Optimal User Pairing For Multiuser MIMO," IEEE Xplore, Sep. 2008, pp. 1-5; 5 pages.

International Search Report for International Application No. PCT/US2020/035315 dated Aug. 24, 2020; 3 pages.

Written Opinion of the International Searching Authority for International Application No. PCT/US2020/035315 dated Aug. 24, 2020; 10 pages.

* cited by examiner

ENHANCEMENT OF RANGE AND THROUGHPUT FOR MULTI-ANTENNA WIRELESS COMMUNICATIONS DEVICES

CROSS-REFERENCE TO RELATED APPLICATIONS

This application claims the benefit under 35 U.S.C. § 119(e) of U.S. Provisional Patent Application No. 62/854,515, filed on May 30, 2019, which is incorporated herein by reference in its entirety for all purposes.

TECHNICAL FIELD

This disclosure generally relates to wireless communications devices having multiple antennas, and more specifically, to enhancing the range and throughput of such wireless communications devices.

BACKGROUND

Wireless communications devices may communicate with each other via one or more communications modalities, such as a WiFi connection. Accordingly, such wireless communication may be implemented in a manner compliant with a wireless communication protocol. Moreover, such wireless communications devices may include various hardware components to facilitate such communication. For example, wireless communications devices may include transmission media that may include one or more antennas. Conventional techniques for utilizing such antennas in a wireless communication device remain limited because they are not able to efficiently select and utilize such antennas for increased throughput.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless communications devices may be implemented in a variety of contexts and environments. For example, wireless communications devices may be implemented in computing devices, mobile devices, and other computing environments. In one example, wireless communications devices may be implemented in vehicles to provide communication between components of the vehicle, such as an on-board computer, and other computing devices, such as a mobile device, a cellular network, or another communications network. The wireless communications devices may include transceivers that handle transmit and receive operations in accordance with wireless communications protocols. The transceivers may be coupled to antennas which may facilitate transmission and reception of data over a transmission medium. During operation, pairs of antennas may be selected and utilized to handle the transmission and reception of data streams.

More specifically, devices may utilize spatial multiplexing to simultaneously leverage multiple transmit and receive antennas to send and receive multiple data streams in parallel. Accordingly, a data packet can be sent via the multiple data streams and be recovered at the received device. However, mismatches in antennas used for the receiving and transmitting may result in degradation of the quality of communications links, and degrade the overall performance of the wireless communications device. More specifically, if aspects of antennas, such as receive antennas used in parallel data streams, are mismatched, then the overall range and throughput of the device is reduced. In one specific example, mismatches or variations in a receive signal strength indicator (RSSI) value may result in a significant reduction in the overall sensitivity of the communications link. Accordingly, if an incorrect pair of antennas is selected, a wireless communications device will experience losses in performance.

Embodiments disclosed herein provide methods, devices, and systems for enhancing the throughput and range of wireless communications devices by identifying and selecting correct antennas in multi-data stream contexts. As will be discussed in greater detail below, various quality metrics may be generated for different combinations of transmit and receive antennas. The quality metrics may be used to identify and select a configuration of antennas, such as a pair of receive antennas, that will yield the best results in performance. In this way, multi-stream devices are configured to dynamically implement antenna selections that enhance performance of the devices by increasing communications link sensitivity, and improve overall range and throughput of the devices.

Figure 1:
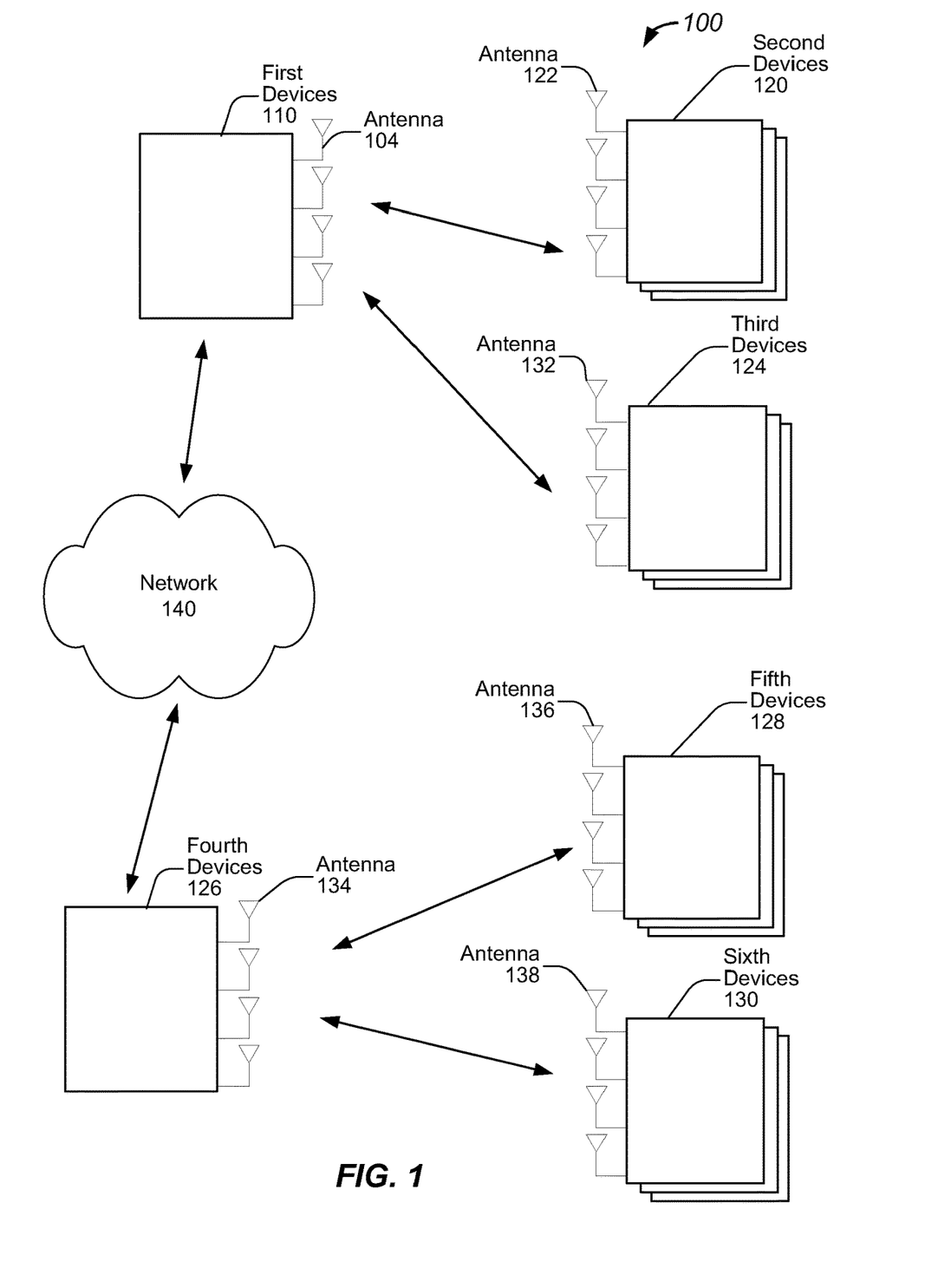
FIG. 1 illustrates an example of a system for enhancement of range and throughput of wireless communications devices, configured in accordance with some embodiments.

FIG. 1 illustrates an example of a system for enhancement of range and throughput of wireless communications devices, configured in accordance with some embodiments. As discussed above, various wireless communications devices may communicate with each other via one or more wireless communications media. For example, wireless communications devices may communicate with each other via a WiFi connection or a Bluetooth connection. As will be discussed in greater detail below, wireless communications devices disclosed herein and systems, such as system 100, that implement such wireless communications devices are configured to utilize multiple antennas to handle the transmission and reception of multiple data streams. Accordingly, embodiments disclosed herein enable the selection and utilization of antennas for both transmission and reception of the data streams such that the range and throughput of devices is enhanced.

In various embodiments, system 100 may include first devices 110 which may be wireless communications devices. As discussed above, such wireless communications devices may be compatible with one or more wireless transmission protocols, such as a WiFi protocol or a Bluetooth protocol. In some embodiments, first devices 110 are multiple input multiple output (MIMO) devices capable of transmitting and receiving multiple data streams. As will be discussed in greater detail below, data that is to be transmitted may be spatially multiplexed into multiple data streams that may be transmitted and received in parallel and simultaneously using different transmit-receive paths. Moreover, first devices 110 may be capable of utilizing multiple frequency bands for data transmission and reception. Accordingly, first devices 110 may be real simultaneous dual band (RSDB) devices that are capable of transmitting and receiving signals on at least two frequency bands simultaneously. Thus, first devices 110 as well as other devices described in greater detail below may include wireless local area network (WLAN) processing devices or controllers that operate as first and second signal sources to transmit and receive signals on first and second frequency bands. In various embodiments, wireless communications devices disclosed herein may be smart devices, such as those found in wearable devices, or may be monitoring devices, such as those found in smart buildings, environmental monitoring, and energy management. It will be appreciated that such wireless communications devices may be any suitable device, such as those found in cars, other vehicles, and even medical implants. In some embodiments, the wireless communications devices may be wireless headsets.

As shown in FIG. 1, various wireless communications devices may be in communication with each other via one or more wireless communications mediums. For example, first devices 110 may each include multiple antennas, such as antenna 104. First devices 110 may also include processing devices and transceivers. As will be discussed in greater detail below, such processing devices, transceivers, and associated radios may be configured to establish communications connections with other devices, and transmit data in the form of data packets via such communications connections. More specifically, different components of first devices 110, such as a processing device, may be configured to implement antenna selection for enhancement of range and throughput of first devices 110.

In some embodiments, system 100 may further include second devices 120 which may also be wireless communications devices. As similarly discussed above, second devices 120 may be compatible with one or more wireless transmission protocols, such as a WiFi protocol or a Bluetooth protocol. Moreover, second devices 120 may also be smart devices or other devices, such as those found in cars, other vehicles, and medical implants. In various embodiments, second devices 120 may be different types of devices than first devices 110. As discussed above, each of second devices 120 may include an antenna, such as antenna 122, as well as processing devices and transceivers, which may also be configured to establish communications connections with other devices, and transmit data in the form of data packets via such communications connections. As discussed above, second devices 120 may also be configured to implement antenna selection operations for enhanced range and throughput.

In various embodiments, system 100 further includes third devices 124, fourth devices 126, fifth devices 128, and sixth devices 130. Moreover, the devices may each have a plurality of antennas, such as antenna 132, antenna 134, antenna 136, and antenna 138. In various embodiments, first devices 110 may be configured as a first access point, and fourth devices 126 may be configured as a second access point. In this way, an access point, such as the first access point, is configured to manage communications between devices, such as second devices 120 and third devices 124, and a communications network, such as network 140. Accordingly, many wireless communications devices may be in communication with each other over a widely implemented communications network, such as the internet.

As shown in FIG. 1, system 100 may include multiple access points that are coupled with multiple different groups of devices. In this way, various devices may communicate with each other via network 140, and such communication may be managed and scheduled by access points. In some embodiments, the access points may pass along communications and requests between each other to facilitate the scheduling of network traffic across numerous different devices. For example, a first access point may schedule requests from second devices 120, third devices 124, fifth devices 128, and sixth devices 130 where requests and traffic from second devices 120 and third devices 124 are passed along through the first access point included in first devices 110.

Figure 2:
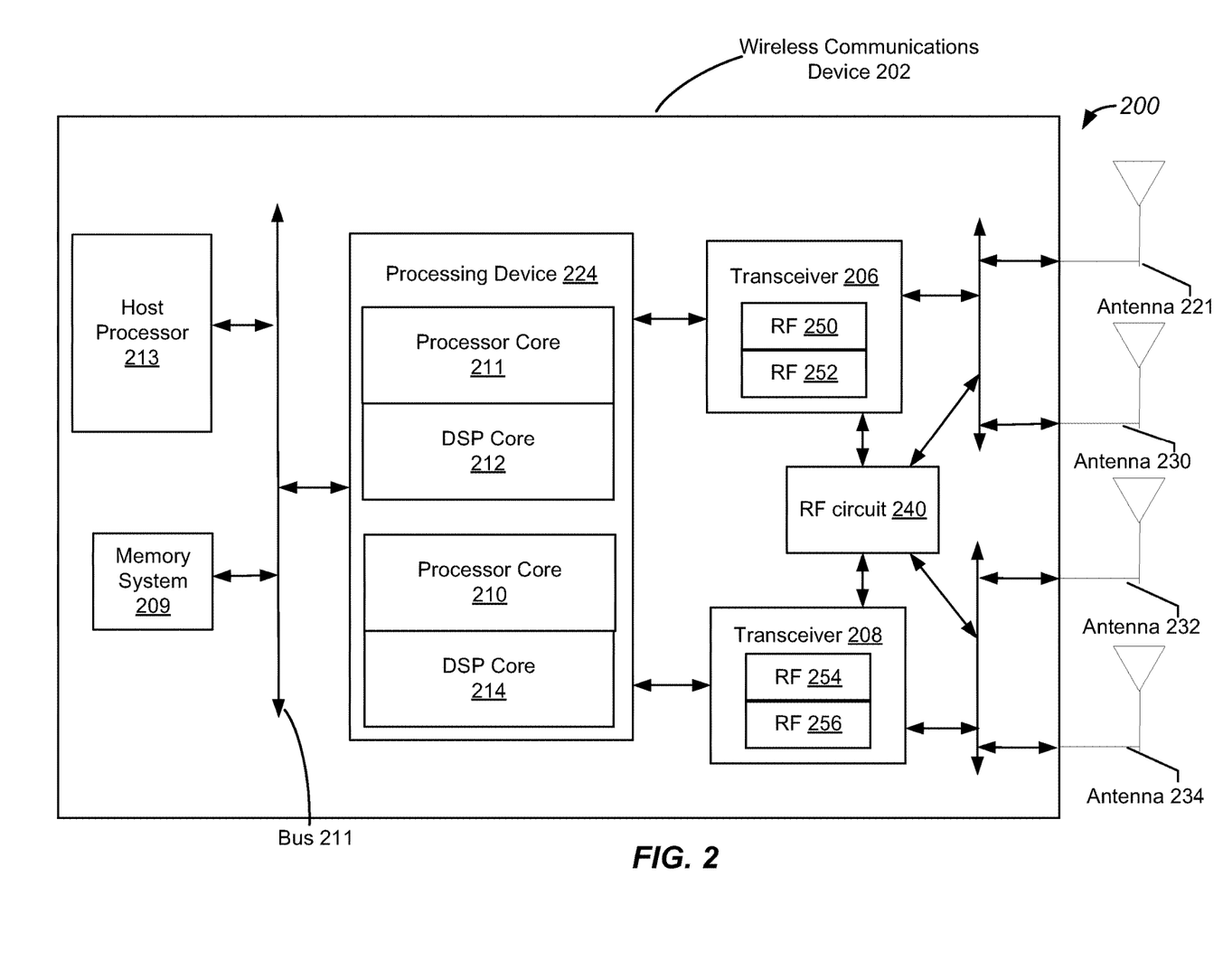
FIG. 2 illustrates a diagram of an additional example of a system for enhancement of range and throughput of wireless communications devices, configured in accordance with some embodiments.

FIG. 2 illustrates a diagram of an additional example of a system for enhancement of range and throughput of wireless communications devices, configured in accordance with some embodiments. More specifically, FIG. 2 illustrates an example of a system, such as system 200, that may include wireless communications device 202. It will be appreciated that wireless communications device 202 may be one of any of first devices 110, second devices 120, third devices 124, fourth devices 126, fifth devices 128, or sixth devices 130 discussed above. As will be discussed in greater detail below, system 200 provides an example of what may be referred to as a 2×2+2×2 device that includes that includes two 2×2 devices each capable of utilizing two data streams.

In various embodiments, wireless communications device 202 includes one or more transceivers, such as transceiver 206 and transceiver 208. For example, system 200 includes transceiver 206 which is configured to transmit and receive signals using a communications medium that may include an antenna, such as antenna 221, antenna 230, antenna 232, or antenna 234. As noted above, transceiver 206 may be included in a WiFi radio, and may be compatible with a WiFi communications protocol, such as an 802.11ax protocol. Accordingly, transceiver 206 may include components, such as a modulator and demodulator as well as one or more buffers and filters, that are configured to generate and receive signals via antenna 221. Such components may be included in radio frequency (RF) transmit and receive paths, also referred to herein as RF chains, represented as RF 250 and RF 252, and discussed in greater detail below with reference to FIG. 5. Wireless communications device 202 may also include transceiver 208 which may include RF 254 and RF 256 and also be communicatively coupled to antennas. As will be discussed in greater detail below, coupling between transceivers 206 and 208 and the antennas may be handled via RF circuit 240, which may be configured to switch coupling between transceivers and antennas based on identified and selected antenna pairs.

System 200 further includes processing device 224 which may include logic implemented using one or more processor cores. Accordingly, processing device 224 is includes one or more processing devices that are configured to implement connection establishment, disconnection, and reestablishment operations as well as antenna selection operations that will be described in greater detail below. In various embodiments, processing device 224 includes one or more components configured to implement a medium access control (MAC) layer that is configured to control hardware associated with a wireless transmission medium, such as that associated with a WiFi transmission medium. In one example, processing device 224 may include processor core block 210 that may be configured to implement a driver, such as a Bluetooth and/or WiFi driver. Processing device 224 may further include digital signal processor (DSP) core block 214 which may be configured to include microcode. Furthermore, processing device 224 may include additional core blocks, such as processor core block 211 and DSP core block 212, for additional transceivers. Accordingly, processor core block 211 and DSP core block 212 may be associated with transceiver 206, and processor core block 210 and DSP core block 214 may be associated with transceiver 208.

In various embodiments, processing device 224 is configured to select antenna pairs and generate a control signal utilized by RF circuit 240 to switch antenna coupling and implement an antenna pair selection. As discussed above, RF circuit 240 is coupled to antennas of wireless communications device 202, such as antenna 221, antenna 230, antenna 232, and antenna 234. In various embodiments, RF circuit 240 may include various components such as an RF switch, a diplexer, and a filter. Accordingly, RF circuit 240 is configured to select one or more pairs of antennas for transmission/reception, and is configured to provide coupling between the selected antenna, such as antenna 221, and other components of system 200 based on a control signal received from processing device 224.

System 200 includes memory system 209 which is configured to store one or more data values associated with antenna selection operations discussed in greater detail below. Accordingly, memory system 209 includes storage device, which may be a non-volatile random access memory (NVRAM) configured to store such data values, and may also include a cache that is configured to provide a local cache. In various embodiments, system 200 further includes host processor 213 which is configured to implement processing operations implemented by system 200.

It will be appreciated that one or more of the above-described components may be implemented on a single chip, or on different chips. For example, transceiver 206, transceiver 208, and processing device 224 may be implemented on the same integrated circuit chip. In another example, transceiver 206, transceiver 208, and processing device 224 may each be implemented on their own chip, and thus may be disposed separately as a multi-chip module or on a common substrate such as a printed circuit board (PCB). It will also be appreciated that components of system 200 may be implemented in the context of a low energy device, a smart device, or a vehicle such as an automobile. Accordingly, some components, such as processing device 224, may be implemented in a first location, while other components, such as antenna 221, may be implemented in second location, and coupling between the two may be implemented via a coupler such as an RF coupler.

Figure 3:
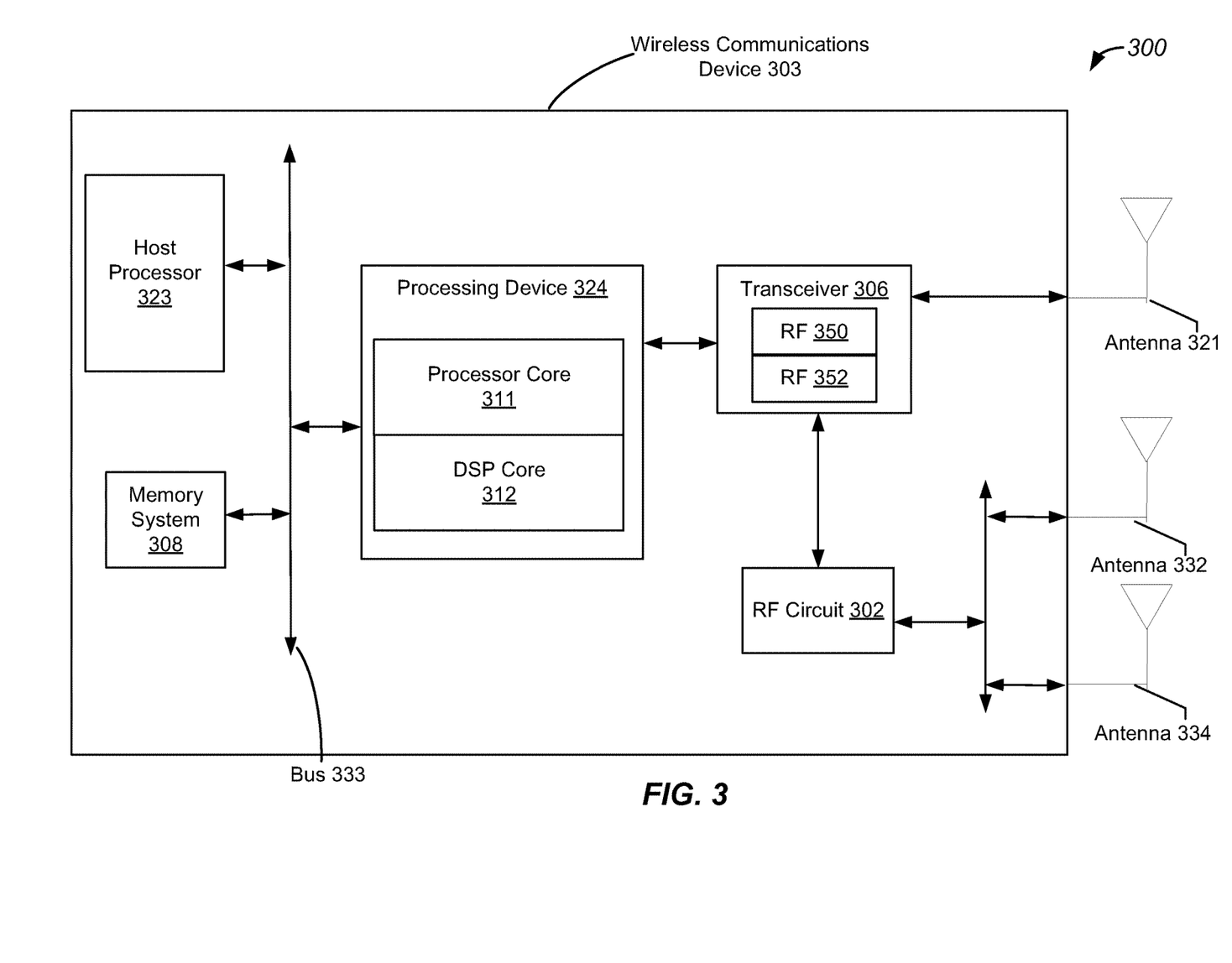
FIG. 3 illustrates a diagram of another example of a system for enhancement of range and throughput of wireless communications devices, configured in accordance with some embodiments.

FIG. 3 illustrates a diagram of another example of a system for enhancement of range and throughput of wireless communications devices, configured in accordance with some embodiments. More specifically, FIG. 3 illustrates an example of a system, such as system 300, that may include wireless communications device 303. As similarly discussed above, it will be appreciated that wireless communications device 303 may be one of any of first devices 110, second devices 120, third devices 124, fourth devices 126, fifth devices 128, or sixth devices 130 discussed above. As will be discussed in greater detail below, system 300 provides an example of what may be referred to as a 2×2 device that does not implement RSDB. Accordingly, embodiments disclosed herein provide enhanced range and throughput for both RSDB and non-RSDB capable wireless communications devices.

As similarly discussed above with reference to FIG. 2, system 300 may include host processor 323, memory system 308, bus 333, processing device 324, transceiver 306, RF circuit 302, antenna 321, antenna 332, and antenna 334. Moreover, processing device 324 may include processor core block 311 and DSP core block 312. As shown in FIG. 3, RF circuit 302 is configured to handle switching between different antennas, such as antenna 332 and 334 to implement different antenna pairings for transceiver 306, and each of RF 350 and RF 352. In this way, an appropriate antenna pair may be selected and used for RF 350, and an appropriate antenna pair may be selected and used for RF 352. As similarly discussed above, processing device 324 is configured to select antenna pairs and generate a control signal used to control the operation of RF circuit 302.

Figure 4:
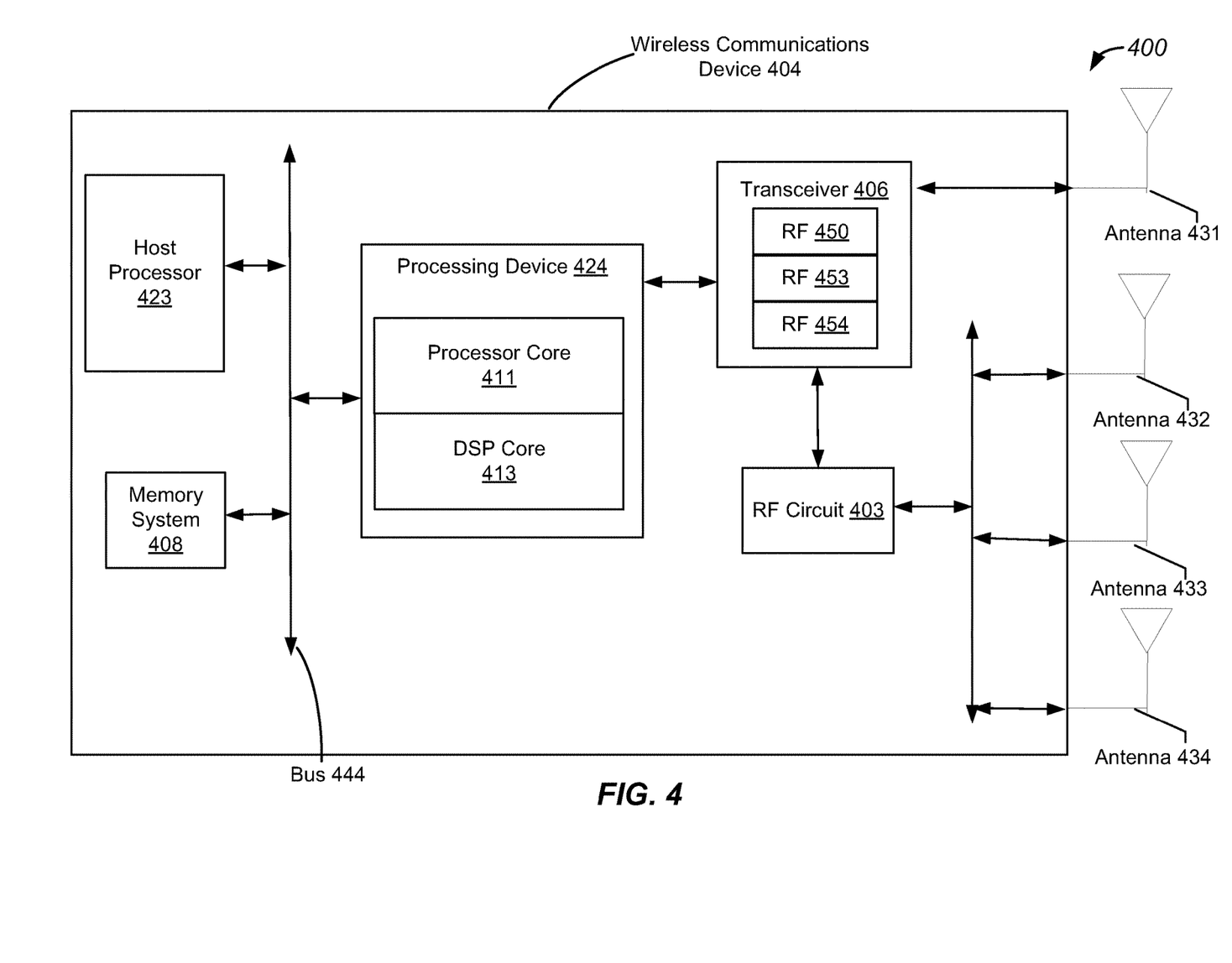
FIG. 4 illustrates a diagram of yet another example of a system for enhancement of range and throughput of wireless communications devices, configured in accordance with some embodiments.

FIG. 4 illustrates a diagram of yet another example of a system for enhancement of range and throughput of wireless communications devices, configured in accordance with some embodiments. More specifically, FIG. 4 illustrates an example of a system, such as system 400, that may include wireless communications device 404. As similarly discussed above, it will be appreciated that wireless communications device 404 may be one of any of first devices 110, second devices 120, third devices 124, fourth devices 126, fifth devices 128, or sixth devices 130 discussed above. As will be discussed in greater detail below, system 400 provides an example of what may be referred to as a 3×3 device. Accordingly, embodiments disclosed herein provide enhanced range and throughput for wireless communications devices that utilize a variety of different configurations to implement multiple data streams, such as 3×3 or 4×4.

As similarly discussed above, system 400 may include host processor 423, memory system 408, bus 444, processing device 424, transceiver 406, RF circuit 403, antenna 431, antenna 432, antenna 433, and antenna 434. Moreover, processing device 424 may include processor core block 411 and DSP core block 413. As shown in FIG. 4, RF circuit 403 is configured to handle switching between different antennas, such as antenna 432, antenna 433, and antenna 434 to implement different antenna pairings for transceiver 406, and each of RF 450, RF 453, and RF 454. In this way, an appropriate antenna pair may be selected and used for RF 450, an appropriate antenna pair may be selected and used for RF 453, and an appropriate antenna pair may be selected and used for RF 454. As similarly discussed above, processing device 424 is configured to select antenna pairs and generate a control signal used to control the operation of RF circuit 403.

Figure 5:
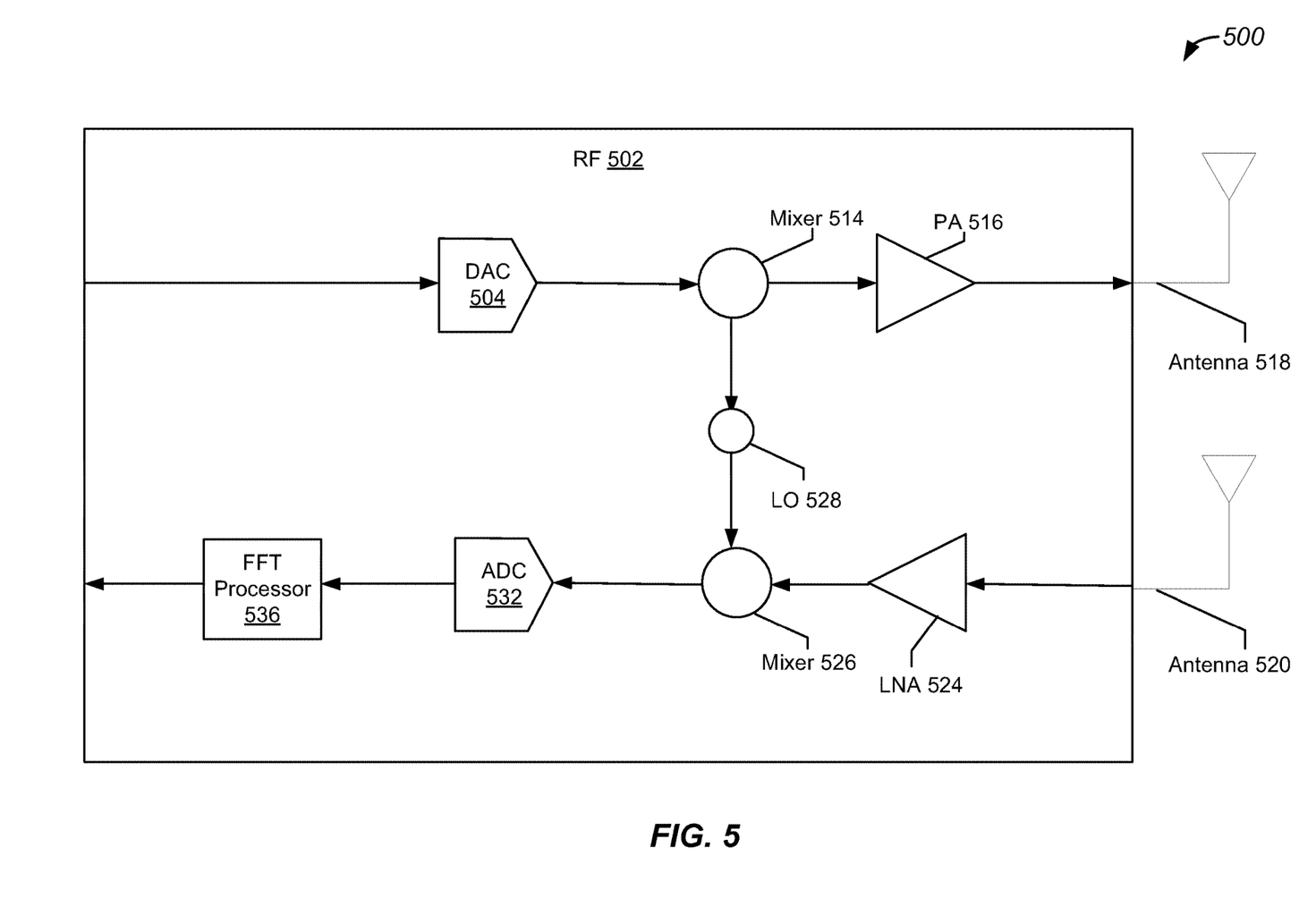
FIG. 5 illustrates a diagram of an example of a portion of a radio frequency (RF) chain of a wireless communications device, configured in accordance with some embodiments.

FIG. 5 illustrates a diagram of an example of a portion of a radio frequency (RF) chain of a wireless communications device, configured in accordance with some embodiments.

As similarly discussed above, a wireless communications device, such as wireless communications device 500, includes an RF chain, such as RF 502, which may include various hardware that handles transmission and reception of data. Accordingly, RF 502 may include a receive path that includes components utilized to receive a signal. Moreover, RF 502 may include a transmit path that includes components utilized to transmit a signal. As also discussed above, the receive path and transmit path may each be coupled to an RF circuit. While not shown in FIG. 5, the RF circuit may handle coupling between the transmit and receive paths and antennas, such as antenna 518 and antenna 520.

As noted above, RF 502 includes a transmit path that is used by a transceiver to transmit data. The transmit path includes digital to analog converter 504, mixer 514, and power amplifier 516. RF 502 further includes a receive path that is used by the transceiver to receive data. The receive path includes, among other components, low noise amplifier 524, mixer 526, analog to digital converter 532, and fast Fourier transform (FFT) processor 536. In some embodiments, RF 502 also includes local oscillator 528 coupled to mixer 514 and mixer 526. Additional components, such as modulators and demodulators, are not shown for clarity.

Figure 6:
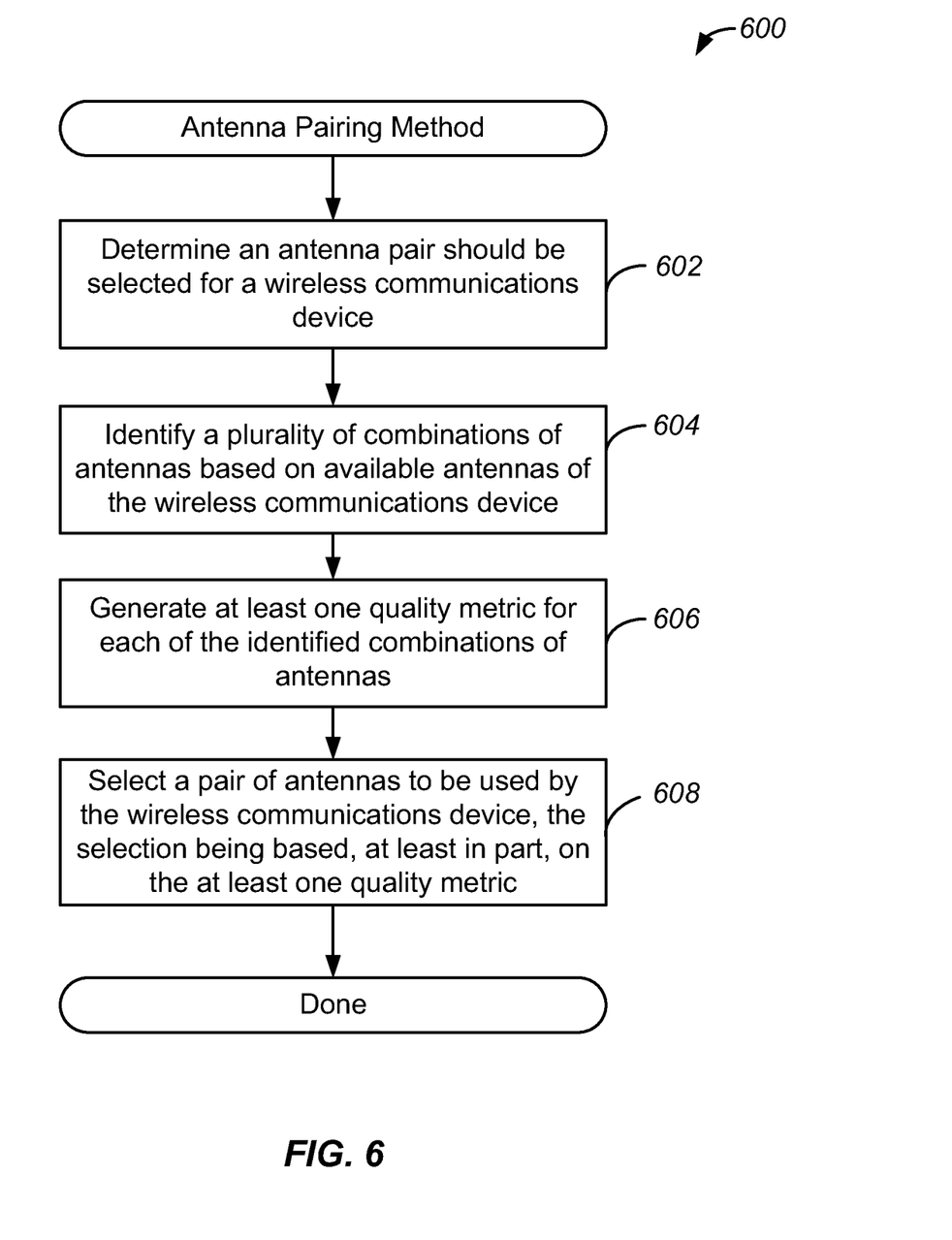
FIG. 6 illustrates a flow chart of an example of an antenna pairing method, implemented in accordance with some embodiments.

FIG. 6 illustrates a flow chart of an example of an antenna pairing method, implemented in accordance with some embodiments. As discussed above, wireless communications devices may communicate with each other via various wireless connections and utilizing multiple antennas. As will be discussed in greater detail below, wireless communications devices are configured to identify and select the best available antenna pairs for use during the transmission and reception of multiple data streams as may occur in a MIMO device. Accordingly, a method, such as method 600, may be implemented to enable the selection and utilization of antennas for both transmission and reception such that the range and throughput of the devices is enhanced.

Accordingly, method 600 may commence with operation 602 during which it may be determined that an antenna pair should be selected for a wireless communications device. In various embodiments, such a determination may be made based on one or more communications events. For example, such a determination may be made in response to a component of a wireless communications device indicating that a data packet should be sent or received. Accordingly, the determination that an antenna pair should be selected may be made responsive to a notification that a data packet is to be transmitted or received. In some embodiments, the determination may be made based on one or more temporal parameters. For example, antenna selection may be implemented periodically based on a passage of a designated amount of time.

Method 600 may proceed to operation 604 during which a plurality of combinations of antennas may be identified based on available antennas of the wireless communications device. The antennas may include known antennas at the wireless communications device as well as known antennas at the device the wireless communications device is communicating with. Accordingly, a wireless communications device may identify each available antenna based on available hardware data, and each antenna may be identified using a unique identifier. During operation 604, each possible combination of antennas between transmitting and receiving devices may be identified and stored as antenna combinations.

Method 600 may proceed to operation 606 during which at least one quality metric may be generated for each of the identified combinations of antennas. As will be discussed in greater detail below, the quality metric may represent a quality of a communications link between antennas in a particular antenna combination. For example, the quality metric may quantify a signal strength for that antenna combination. In some embodiments, signals sent from a transmitting device may be used to facilitate such measurements. Moreover, as similarly discussed above, the transmitting device may be a dual band device that has a first and second signal source transmitting at a first band and a second band. Accordingly, quality metrics may be computed at each band. In this way, the appropriate quality metrics may be generated for each combination of antennas, or may be retrieved form memory if such quality metrics were previously generated and are already available.

Method 600 may proceed to operation 608 during which a pair of antennas may be selected based, at least in part, on the at least one quality metric. Accordingly, the identified antenna combinations may be sorted and/or filtered based on their associated quality metrics, and a particular pair may be selected based on its associated quality metric. For example, a pair with a highest quality metric may be selected. The selected pair of antennas may be used by the wireless communications device for transmission or reception of data. For example, an antenna pair may be a pair of receive antennas specific to a wireless communications device that is receiving data streams.

Figure 7:
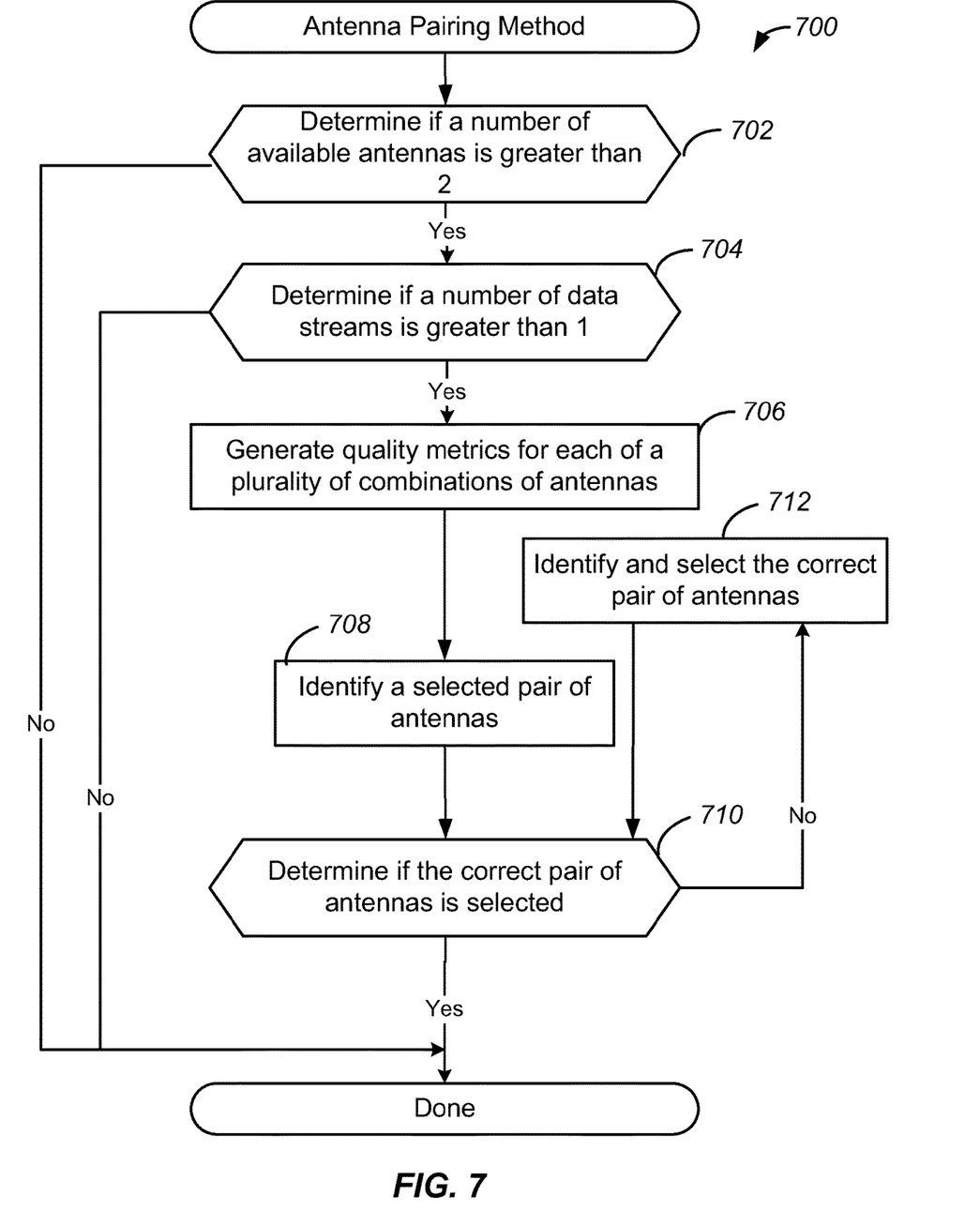
FIG. 7 illustrates a flow chart of another example of an antenna pairing method, implemented in accordance with some embodiments.

FIG. 7 illustrates a flow chart of another example of an antenna pairing method, implemented in accordance with some embodiments. As discussed above, wireless communications devices may be configured to identify and select the best available antenna pairs for use during the transmission and reception of multiple data streams as may occur in a MIMO device. As will be discussed in greater detail below, transmission and reception characteristics of the antennas may be utilized to identify and implement such selections.

Accordingly, method 700 may commence with operation 702 during which it may be determined if a number of available antennas is greater than 2. Such a determination may be made based on available hardware data. As similarly discussed above, a component, such as a processing device, may have access to available hardware data that includes information about the wireless communications device in which the processing device is implemented, as well as hardware information about devices in communication with the wireless communications device. Such information may have been received during a configuration operation, or during the establishment of a communications link. If it is determined that the number of available antennas is less than 2, method 700 may terminate. If it is determined that the number of available antennas is greater than 2, method 700 may proceed to operation 704.

Accordingly, during operation 704 during it may be determined if a number of data streams is greater than one. Such a determination may be made by a processing device of a wireless communications device, and may be made based on a transmission/reception modality that has been selected. For example, if the device has been configured as a MIMO device, data may be spatially multiplexed into multiple data streams by the processing device. Accordingly, the processing device may know if multiple data streams are present, and how many data streams are being utilized. If it is determined that the number of data streams is not greater than one, method 700 may terminate. In such a situation, antenna pair selection is not implemented, and an ordinary transmission technique may be utilized. If it is determined that the number of data streams is greater than one, method 700 may proceed to operation 706.

During operation 706, quality metrics may be generated for each of a plurality of antennas. As disclosed herein antenna combinations may also be described in reference to channels or transmitter-receiver links (T-R links). In one specific example, a 2×2 device may be configured as a station, and may have four receive antennas in communication with two transmit antennas of an access point. In this example, there may be a possible eight different channels utilizing different combinations of two transmit antennas and the 4 receive antennas. Accordingly, as similarly discussed above, the possible different combinations of antennas corresponding to the channels may be computed and identified, and during operation 706, one or more quality metrics may be generated for each antenna combination. As used herein, an antenna combination may refer to a combination of a transmit antenna in a transmit device and a receive antenna in a receiving device.

As similarly discussed above, the quality metric may represent a quality of a communications link between antennas in a particular antenna combination. In one example, the quality metric may quantify a signal strength for that antenna combination, or some other aspect, such as a signal-to-noise (SNR) ratio or any suitable interference quantifier. In a specific example, the quality metric may be a metric such as an RSSI value, an adjacent channel interference (ACI) value, or a co-channel interference (CCI) value. In various embodiments, the generation of the RSSI value may be implemented by a processor of the wireless communications device, and may be performed periodically or as part of the antenna pair selection method. Furthermore, the ACI value and CCI values may be generated by the processor in a similar manner.

In some embodiments, the quality metric is an exponential effective SNR mapping (EESM) metric that is computed based on the signal strength of each sub-carrier of a particular channel, and weighting of the SNR of each sub-carrier in an exponential way. In various embodiments, a sub-carrier band is a portion of a frequency band or channel used by a wireless communications device. Accordingly, a particular frequency band may be divided into multiple sub-carriers. For example, a particular frequency band may be divided into sub-carrier bands of a few hundred kilohertz each (e.g. 300 kHz). As similarly discussed above, in MIMO devices, the transmission of data may be multiplexed across the sub-carriers, e.g., by using orthogonal frequency division multiplexing (OFDM). According to some embodiments, the EESM metric may be computed based on data sent and received on the sub-carriers. In one example, a processing device may be used to compute an indication of signal strength and an indication of an SNR for each sub-carrier, and to generate an EESM metric based on the computed signal strengths and SNRs by mapping the computed SNRs to a single effective SNR. Such mapping may be implemented via any suitable statistical technique, such as an exponentially bounded probability distribution.

The quality metric may also be a metric inferred from computations used to implement aspects of multi-data stream communications modalities. As discussed above, in MIMO modalities, data may be spatially multiplexed into multiple data streams that are transmitted and then received simultaneously and then processed to recover the data. As discussed above, components of the wireless communications devices, such as processing devices and physical layers implemented within processing devices, are configured to identify the presence of and quantify interference, and are also configured to implement decomposition operations to recover the data from the multiple data streams. As part of the process of such spatial multiplexing, the processing device computes a channel matrix for the different channels. Such computations may be implemented by a base filtering engine included in the processing device.

In various embodiments, the channel matrix can be used to infer the eigenvalues for a particular channel, and the eigenvalues can be used to assess the quality of the channel. More specifically, the eigenvalues may be used to identify a condition number which may be a number that represents how much an output may change for a small change in an input. Thus, the condition number may be a measure of a channel's sensitivity to errors. Furthermore, a matrix having a low condition number may be said to be well-conditioned, while a matrix with a high condition number may be said to be poorly conditioned. Accordingly, in instances where the computed channel matrix has a value of the condition number close to one, a particular antenna combination may be a well-conditioned MIMO channel suitable for spatial multiplexing. In instances where the condition number is not close to one, and is much higher, the antenna combination results in an ill-conditioned MIMO channel. Thus, according to various embodiments, the condition number may be computed via an eigenvalue decomposition, and stored as a quality metric.

In various embodiments, the condition number may vary across frequencies. Accordingly, a frequency sweep may be implemented to measure the condition number across multiple frequencies, and a statistical measure of variance may be computed and used as the quality metric. For example, the quality metric may be a standard deviation of the condition numbers computed at different frequencies.

Accordingly, during operation 706, a system component, such as a processing device, may query a storage location to determine if quality metrics are available. If available, the quality metrics may be retrieved. If not available, the quality metrics may be generated. Accordingly, during operation 706, the processing device may implement one or more operations to generate the appropriate quality metrics. For example, the processing device may initiate the testing and recording of an RSSI value for each identified antenna combination. Furthermore, multiple quality metrics may be retrieved and or generated for each identified antenna combination. In this way, multiple quality metrics may be made available for each identified antenna combination.

Method 700 may proceed to operation 708 during which a currently selected pair of antennas may be identified. In various embodiments, the currently selected pair of antennas is a pair that may have been previously identified and stored for a particular transceiver and/or data stream. For example, if during a transceiver's previous transmitting or receiving operation a particular pair of receive antennas may have been used to receive two data streams. Accordingly, identifiers identifying that pair of antennas may have been stored in memory and may represent the currently selected pair. If no such identifiers are stored in memory, a default value or selection may be utilized, such as the first available antennas.

Method 700 may proceed to operation 710 during which it may be determined if the correct pair of antennas is selected. In various embodiments, the correct pair refers to a pair of antennas that may best handle receiving/transmitting of multiple data streams. For example, for two data streams, two antenna combinations with the best matching quality metric may be identified, and at least a portion of the antenna identifier information may be stored as a correct antenna pair. Moreover, various modalities may be implemented to determine if quality metrics are matching. In one example, the identified antenna combinations may have been sorted and/or filtered based on theft associated quality metrics. More specifically, the identified antenna combinations may be sorted in descending order of RSSI value, and the two antenna combinations having the closest RSSI values may be identified as the best or correct pair. In the specific instance of the receiving device, the two receive antennas in those two antenna combinations may be identified and stored as an antenna pair.

In another example, as similarly discussed above with reference to RSSI values, antenna combinations having the similar ACI values or similar CCI values may be used to identify the best or correct pair of antennas. In yet another example, antenna combinations with the best condition numbers may be used to identify the best or correct pair of antennas. In this way, a pair of antennas having quality metrics best suited for multi-data stream communication may be identified as the correct pair of antennas, and may be compared against the currently selected pair of antennas. Such a comparison may be implemented based on a comparison of antenna identifiers. If it is determined that the correct pair of antennas is selected, method 700 may terminate. If it is determined that the correct pair of antennas is not selected, method 700 may proceed to operation 712.

During operation 712, a correct pair of antennas may be identified and selected. Once selected, method 700 may return to operation 710. Accordingly, during operation 712, the correct pair of antennas may be selected by updating a storage location in memory to identify the correct pair of antennas and also generate a control signal to control the operation of an RF circuit, as discussed above, to implement the appropriate coupling for the new antenna pairing. Accordingly, the RF circuit may update coupling between a transceiver and an antenna to select the best antenna.

Figure 8:
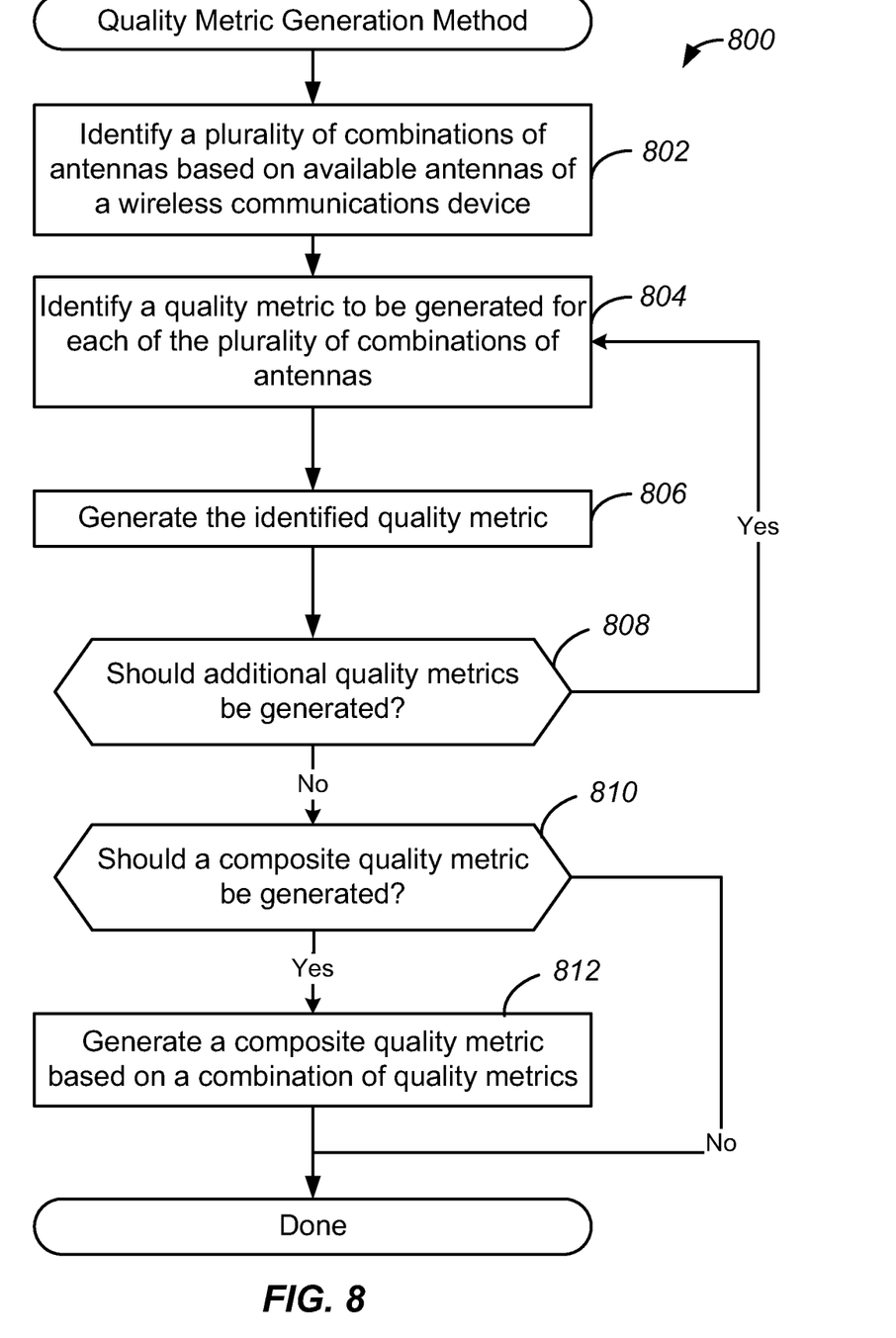
FIG. 8 illustrates a flow chart of an example of a quality metric generation method, implemented in accordance with some embodiments.

FIG. 8 illustrates a flow chart of an example of a quality metric generation method, implemented in accordance with some embodiments. As discussed above, wireless communications devices may be configured to identify and select the best available antenna pairs for use with multi-data stream communications modalities, such as those used by MIMO devices. As will be discussed in greater detail below, multiple different quality metrics may be generated and utilized, as well as combinations of different quality metrics, to enable the identification and implementation of such antenna pair selections.

Accordingly, method 800 may commence with operation 802 during which a plurality of antenna combinations is identified based on available antennas of a wireless communications device. As similarly discussed above, a component, such as a processing device, may have access to available hardware data that includes information about the wireless communications device in which the processing device is implemented, as well as hardware information about devices in communication with the wireless communications device. Accordingly, during operation 802, a system component, such as a processing device, may identify all of the available antennas as well as possible antenna combinations. As also noted above, the antenna combinations may be stored in a data object that identifies the pairs using a pair identifier as well as antenna identifiers for each antenna included in the pair.

Method 800 may proceed to operation 804 during which a quality metric to be generated is identified for each of the plurality of antenna combinations. Accordingly, a system component, such as a processing device, may identify a quality metric to be generated based on a first configuration parameter that may be stored in memory. As noted above, for each antenna combination, at least one quality metric may be generated. To determine which quality metric should be generated, the processing device may query the storage location and identify a quality metric based on the value of the first configuration parameter. In various embodiments, the first configuration parameter may have been set by an administrator during a configuration operation. In some embodiments, the first configuration parameter may be set to a default value.

Method 800 may proceed to operation 806 during which the quality metric is generated for each of the plurality of antenna combinations. Accordingly, the processing device may proceed to generate the identified quality metric for each of the identified antenna combinations, and the generated quality metric may be stored in memory for subsequent use during antenna selection, as discussed above.

Method 800 may proceed to operation 808 during which it may be determined if additional quality metrics should be generated. As discussed above, multiple quality metrics may be generated for each antenna combination. Accordingly, the first configuration parameter may identify several quality metrics to be generated. If it is determined that additional quality metrics should be generated, method 800 may return to operation 804 and additional iterations of quality metric generation may be implemented for each additional identified quality metric. If it is determined that no additional quality metrics should be generated, method 800 may proceed to operation 810.

Accordingly, during operation 810 it may be determined if a composite quality metric should be generated. Such a determination may be made based on a value of a second configuration parameter. In various embodiments, the second configuration parameter may identify one or more quality metrics to be combined into a composite metric. In this way, it may be determined that a single metric should be generated that is capable of representing an overall quality of an identified antenna combination. As similarly discussed above, the second configuration parameter may be defined by an administrator or may be a default value. If it is determined that a composite quality metric should not be generated, method 800 may terminate. If it is determined that a composite quality metric should be generated, method 800 may proceed to operation 812.

During operation 812, a composite quality metric may be generated based on a combination of quality metrics. In various embodiments, one or more combination operations may be implemented on the generated quality metrics to combine them into a single metric capable of representing an overall quality of an identified antenna combination. For example, a combination of both RSSI and interference metrics may be used. Such a combination may be implemented using a combined ranking technique. Moreover, one of the metrics may be weighted more heavily in the generation of the composite metric. In this way, any suitable combination of quality metrics may be used to identify a correct pair of antennas.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:
   identifying a plurality of combinations of antennas based on a plurality of available antennas for a wireless communications device, wherein the plurality of available of antennas numbers more than two;
   generating, using a processing device included in a multiple-input-multiple-output (MIMO) device, a plurality of quality metrics comprising at least one quality metric for each of the identified combinations of antennas, wherein each of the at least one quality metrics represents a signal quality of a signal associated with each of the plurality of antennas, wherein the signal is a spatial stream, and wherein the generating is responsive to determining a number of multiplexed data streams included in the spatial stream is greater than one; and
   selecting, using the processing device, at least two antennas of the wireless communications device based, at least in part, on a similarity between values of a quality metric for each of the at least two antennas, wherein the at least two antennas that are selected have the closest values of quality metrics, and wherein the at least two antennas are selected for use by the wireless communications device during a transmitting or receiving operation.

2. The method of claim 1, wherein the plurality of quality metrics comprises a measurement of signal strength from signals received using the plurality of available antennas.

3. The method of claim 2, wherein the signals are received from at least a first signal source and a second signal source, and wherein the first signal source uses a first band supported by a real simultaneous dual band (RSDB) wireless local area network (WLAN) processing device, and wherein the second signal source uses a second band supported by the RSDB WLAN processing device.

4. The method of claim 1, wherein the plurality of quality metrics comprises an indication of adjacent channel interferences or co-channel interference.

5. The method of claim 1, wherein the plurality of quality metrics comprises one or more condition numbers computed based on eigenvalues associated with the plurality of combinations of antennas.

6. The method of claim 1, wherein the selecting is based on a receive signal strength indicator (RSSI) value determined for each of the plurality of combinations of antennas.

7. The method of claim 1, wherein the plurality of quality metrics comprises quality metrics for each of the identified combinations of antennas, and wherein the method further comprises:
   generating a composite quality metric for each of the identified combinations of antennas based, at least in part, on the plurality of quality metrics.

8. The method of claim 1, wherein the plurality of quality metrics comprises an indication of a signal-to-noise ratio (SNR) metric.

9. The method of claim 8, wherein the indication of the SNR metric is an exponential effective SNR mapping (EESM) metric.

10. A device comprising:
    at least one transceiver;
    a processing device comprising one or more processors configured to:
    identify a plurality of combinations of antennas based on a plurality of available antennas for a wireless communications device, wherein the plurality of available of antennas numbers more than two;
    generate a plurality of quality metrics comprising at least one quality metric for each of the identified combinations of antennas, wherein each of the at least one quality metrics represents a signal quality of a signal associated with each of the plurality of antennas, wherein the signal is a spatial stream, and wherein the plurality of quality metrics are generated responsive to determining a number of multiplexed data streams included in the spatial stream is greater than one; and
    select at least two antennas of the wireless communications device based, at least in part, on a similarity between values of a quality metric for each of the at least two antennas, wherein the selected at least two antennas have the closest values of quality metrics, and wherein the at least two antennas are selected for use by the wireless communications device during a transmitting or receiving operation,
    wherein the at least one transceiver and the processing device are included in a MIMO device.

11. The device of claim 10, wherein the plurality of quality metrics comprises a measurement of signal strength from signals received using each of the plurality of available antennas.

12. The device of claim 11, wherein the signals are received from at least a first signal source and a second signal source, wherein the first signal source uses a first band supported by a real simultaneous dual band (RSDB) wireless local area network (WLAN) processing device, and wherein the second signal source uses a second band supported by the RSDB WLAN processing device.

13. The device of claim 10, wherein the plurality of quality metrics comprises an indication of adjacent channel interferences or co-channel interference.

14. The device of claim 10, wherein the plurality of quality metrics comprises one or more condition numbers computed based on eigenvalues associated with the plurality of combinations of antennas.

15. The device of claim 10, wherein the plurality of quality metrics comprises an indication of a signal-to-noise ratio (SNR) metric, and wherein the SNR metric comprises an exponential effective SNR mapping (EESM) metric.

16. A system comprising:
    a plurality of antennas;
    a first transceiver coupled to the plurality of antennas;
    a second transceiver coupled to the plurality of antennas; and
    a processing device comprising one or more processors configured to:
    identify a plurality of combinations of antennas based on a plurality of available antennas for a wireless communications device, wherein the plurality of available of antennas numbers more than two;
    generate a plurality of quality metrics comprising at least one quality metric for each of the identified combinations of antennas, wherein each of the at least one quality metrics represents a signal quality of a signal associated with each of the plurality of antennas, and wherein the plurality of quality metrics are generated responsive to determining a number of multiplexed data streams included in a spatial stream is greater than one; and
    select at least two antennas for each of the first transceiver and the second transceiver, wherein the selecting is based, at least in part, on a similarity between values of a quality metric for each of the at least two antennas, and wherein the antennas that are selected have the closest values of quality metrics, and wherein the antennas are selected for use by the first transceiver and the second transceiver during transmitting or receiving operations.

17. The system of claim 16, wherein the plurality of quality metrics comprises a measurement of signal strength from signals received using each of the plurality of available antennas.

18. The system of claim 17, wherein the plurality of quality metrics comprises an indication of a signal-to-noise ratio (SNR) metric, and wherein the SNR metric comprises an exponential effective SNR mapping (EESM) metric.

19. The system of claim 16, wherein the plurality of quality metrics comprises an indication of adjacent channel interferences or co-channel interference.

20. The system of claim 16, wherein the plurality of quality metrics comprises one or more condition numbers computed based on eigenvalues associated with the plurality of combinations of antennas.

* * * * *